United States Patent
Farnsworth et al.

(10) Patent No.: US 8,340,042 B2
(45) Date of Patent: *Dec. 25, 2012

(54) CONFIGURING SIGNALING RADIO BEARER INFORMATION IN A USER EQUIPMENT PROTOCOL STACK

(75) Inventors: Andrew John Farnsworth, Birmingham (GB); Mark Dennis Norton, Birmingham (GB)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/117,780

(22) Filed: May 27, 2011

(65) Prior Publication Data

US 2011/0228703 A1   Sep. 22, 2011

Related U.S. Application Data

(63) Continuation of application No. 12/268,129, filed on Nov. 10, 2008, now Pat. No. 7,969,941, which is a continuation of application No. 10/939,836, filed on Sep. 13, 2004, now Pat. No. 7,463,602.

(51) Int. Cl.
  *H04W 80/02* (2009.01)
  *H04W 28/16* (2009.01)
  *H04W 88/02* (2009.01)
  *H04W 88/00* (2009.01)

(52) U.S. Cl. ........ 370/329; 370/252; 370/437; 370/469; 455/450

(58) Field of Classification Search .................. 370/252, 370/236, 254, 255, 276, 280–282, 310, 310.1, 370/310.2, 314, 329, 343–349, 352–356, 370/389, 401, 437, 465–469; 455/418, 450, 455/452, 452.1, 452.2

See application file for complete search history.

(56) References Cited

U.S. PATENT DOCUMENTS 5,684,953 A * 11/1997 Hummel ........................ 709/234
(Continued)

FOREIGN PATENT DOCUMENTS

EP   1420551 A2   5/2004
(Continued)

OTHER PUBLICATIONS

Farnsworth, Andrew John; U.S. Appl. No. 10/939,836, filed Sep. 13, 2004; Title: "Configuring Signalling Radio Bearer Information in a User Equipment Protocol Stack".

(Continued)

*Primary Examiner* — Chi Pham
*Assistant Examiner* — Ahmed Elallam
(74) *Attorney, Agent, or Firm* — Conley Rose, P.C.; J. Robert Brown, Jr.

(57) ABSTRACT

In accordance with the teachings described herein, systems and methods are provided for configuring signaling radio bearer information in a user equipment protocol stack. A wireless network may be used that includes a radio access network for transmitting information between a user equipment device and a core network. An instruction may be received to generate a signaling radio bearer configuration information element (IE) that includes configuration information for a pre-selected number of signaling radio bearers. The signaling radio bearer configuration IE may then be generated, while ensuring that the signaling radio bearer configuration IE includes configuration information for a required minimum number of signaling radio bearers. The signaling radio bearer configuration information element may be transmitted from the radio access network to the user equipment device for use in configuring the signaling radio bearers in the user equipment device.

6 Claims, 9 Drawing Sheets

U.S. PATENT DOCUMENTS

| | | | | |
|---|---|---|---|---|
| 5,999,825 | A * | 12/1999 | Geulen | 455/560 |
| 6,535,979 | B1 * | 3/2003 | Britschgi et al. | 713/163 |
| 6,701,151 | B2 * | 3/2004 | Diachina et al. | 455/452.1 |
| 6,751,227 | B1 * | 6/2004 | Ahmavaara et al. | 370/410 |
| 6,826,406 | B1 * | 11/2004 | Vialen et al. | 455/450 |
| 6,898,429 | B1 * | 5/2005 | Vialen et al. | 455/432.1 |
| 6,907,248 | B2 * | 6/2005 | Lee et al. | 455/450 |
| 6,925,298 | B2 * | 8/2005 | Ho | 455/411 |
| 7,009,940 | B2 * | 3/2006 | Vialen et al. | 370/252 |
| 7,039,026 | B2 * | 5/2006 | Francoeur et al. | 370/328 |
| 7,068,636 | B2 * | 6/2006 | Kuo | 370/338 |
| 7,184,792 | B2 * | 2/2007 | Mir | 455/522 |
| 7,382,750 | B2 * | 6/2008 | Wu | 370/331 |
| 7,953,226 | B2 * | 5/2011 | Funnell et al. | 380/273 |
| 2002/0187789 | A1 * | 12/2002 | Diachina et al. | 455/452 |
| 2003/0100291 | A1 * | 5/2003 | Krishnarajah et al. | 455/410 |
| 2003/0157927 | A1 * | 8/2003 | Yi et al. | 455/411 |
| 2004/0009767 | A1 * | 1/2004 | Lee et al. | 455/422.1 |
| 2004/0114565 | A1 * | 6/2004 | Sipola | 370/349 |
| 2004/0120265 | A1 * | 6/2004 | Numminen et al. | 370/252 |
| 2004/0180675 | A1 * | 9/2004 | Choi et al. | 455/458 |
| 2004/0184434 | A1 * | 9/2004 | Sebire et al. | 370/349 |
| 2004/0185860 | A1 * | 9/2004 | Marjelund et al. | 455/450 |
| 2005/0083876 | A1 * | 4/2005 | Vialen et al. | 370/328 |
| 2005/0141471 | A1 * | 6/2005 | Virtanen et al. | 370/342 |
| 2005/0169210 | A1 * | 8/2005 | Funnell | 370/328 |
| 2005/0174956 | A1 * | 8/2005 | Yi et al. | 370/312 |
| 2005/0266846 | A1 * | 12/2005 | Kim | 455/436 |
| 2005/0281222 | A1 * | 12/2005 | Ranta-Aho et al. | 370/328 |
| 2006/0034204 | A1 * | 2/2006 | Lee et al. | 370/312 |
| 2006/0040645 | A1 * | 2/2006 | Grilli et al. | 455/412.1 |
| 2007/0127432 | A1 * | 6/2007 | Hwang et al. | 370/348 |
| 2007/0153788 | A1 * | 7/2007 | Yi et al. | 370/389 |

FOREIGN PATENT DOCUMENTS

| | | |
|---|---|---|
| WO | 0154381 A2 | 7/2001 |

OTHER PUBLICATIONS

Farnsworth, Andrew John; U.S. Appl. No. 12/268,129, filed Nov. 10, 2008; Title: "Configuring Signaling Radio Bearer Information in a User Equipment Protocol Stack".

Brown, et al: "A Subset of the ISDN network Layer Protocol Suitable for Implementation in Hardware," Networks: Evolution or Revolution? New Orleans, Mar. 27-31, 1988, Proceedings of the Annual Joint Conference of the Computer and Communications Societies. (INFOCOM), New York, IEEE, US, vol. CONF. 7, Mar. 27, 1988, pp. 1065-1071, XP010011776.

Universal Mobile Telecommunications System (UMTS); Radio Resource Control (RRC) Protocol Specification (3GPP TS 25.331 version 5.5.0 Release 5); ETSI TS 125 331" ETSI Standards, European Telecommunications Standards Institute, Sophia-Antipo, FR, vol. 3-R2, No. V550, Jun. 2003, pp. 248-259, XP 014008824.

Lee, et al,; "Commit-Order Oriented Validation Scheme for Transaction Scheduling in Mobile Distributed Database Systems: COOV," IEICE Transaction on Information and Systems, Institute of Electronics Information and Comm. Eng. Tokyo, Japan, vol. E80-D, No. 0 1, 1997, pp. 10-14, XP000701922.

3GPP TS 25.331 V3.10.0; 3rd Generation Partnership Project; Techincal Specification Group Radio Access Network; Radio Resource Control (RRC); Protocol Specification; Release 1999, Mar. 2003; 824 pages.

Office Action dated Jan. 4, 2008; U.S. Appl. No. 10/939,836, filed Sep. 13, 2004; 11 pages.

Notice of Allowance dated Jun. 20, 2008; U.S. Appl. No. 10/939,836, filed Sep. 13, 2004; 7 pages.

Notice of Allowance dated Aug. 12, 2008; U.S. Appl. No. 10/939,836, filed Sep. 13, 2004; 3 pages.

Office Action dated Jun. 8, 2009; U.S. Appl. No. 12/268,129, filed Nov. 10, 2008; 8 pages.

Final Office Action dated Nov. 27, 2009; U.S. Appl. No. 12/268,129, filed Nov. 10, 2008; 10 pages.

Advisory Action dated Mar. 2, 2010; U.S. Appl. No. 12/268,129, filed Nov. 10, 2008; 7 pages.

Office Action dated May 17, 2010, U.S. Appl. No. 12/268,129, filed Nov. 10, 2008; 14 pages.

Final Office Action dated Oct. 26, 2010; U.S. Appl. No. 12/268,129, filed Nov. 10, 2008; 18 pages.

Advisory Action dated Jan. 12, 2011; U.S. Appl. No. 12/268,129, filed Nov. 10, 2008; 4 pages.

Notice of Allowance dated Feb. 23, 2011; U.S. Appl. No. 12/268,129, filed Nov. 10, 2008, 11 pages.

European Search Report dated Feb. 28, 2005; Application No. 04021719.2; 12 pages.

CN Communication dated Apr. 4, 2008; CN200510113250.7; 9 pages.

CN Communication dated Sep. 12, 2008; CN200510113250.7; 5 pages.

CN Communication dated Mar. 6, 2009; CN200510113250.7; 2 pages.

* cited by examiner

CONFIGURING SIGNALING RADIO BEARER INFORMATION IN A USER EQUIPMENT PROTOCOL STACK

CROSS REFERENCE TO RELATED APPLICATION

This application is a continuation of U.S. patent application Ser. No. 12/268,129, filed on Nov. 10, 2008 entitled "Configuration Signaling Radio Bearer Information in a User Equipment Protocol Stack," which is a continuation of U.S. Pat. No. 7,463,602, issued on Dec. 9, 2008 entitled "Configuration Signaling Radio Bearer Information in a User Equipment Protocol Stack," which are incorporated by references herein as if reproduced in their entirety.

BACKGROUND

UMTS (Universal Mobile Telecommunications System) is a third generation public land mobile telecommunication system. Various standardization bodies publish standards for UMTS, each in their respective areas of competence. For instance, the 3GPP (Third Generation Partnership Project) publishes standards for GSM (Global System for Mobile Communications) and W-CDMA (Wideband Code Division Multiple Access) based UMTS, and the 3GPP2 (Third Generation Partnership Project 2) publishes standards for CDMA2000 (Code Division Multiple Access) based UMTS. Standard document 3GPP TS 25.331 addresses the Radio Resource Control (RRC) protocol specification.

SUMMARY

In accordance with the teachings described herein, systems and methods are provided for configuring signaling radio bearer information. A wireless network may be used that includes a radio access network for transmitting information between a user equipment device and a core network. An instruction may be received to generate a signaling radio bearer configuration information element (IE) that includes configuration information for a pre-selected number of signaling radio bearers. The signaling radio bearer configuration IE may then be generated, while ensuring that the signaling radio bearer configuration IE includes configuration information for a required minimum number of signaling radio bearers. The signaling radio bearer configuration information element may be transmitted from the radio access network to the user equipment device for use in configuring signaling radio bearers in the user equipment device.

A signaling radio bearer configuration information element (IE) may be received by the user equipment device and include configuration information for a pre-selected number of signaling radio bearers. The user equipment device may determine whether the received signaling radio bearer configuration IE includes configuration information for a required minimum number of signaling radio bearers. If the received signaling radio bearer configuration IE does not include configuration information for the required minimum number of signaling radio bearers, then the user equipment device may identify the received signaling radio bearer configuration IE as an anomalous information element.

DETAILED DESCRIPTION

Figure 1:
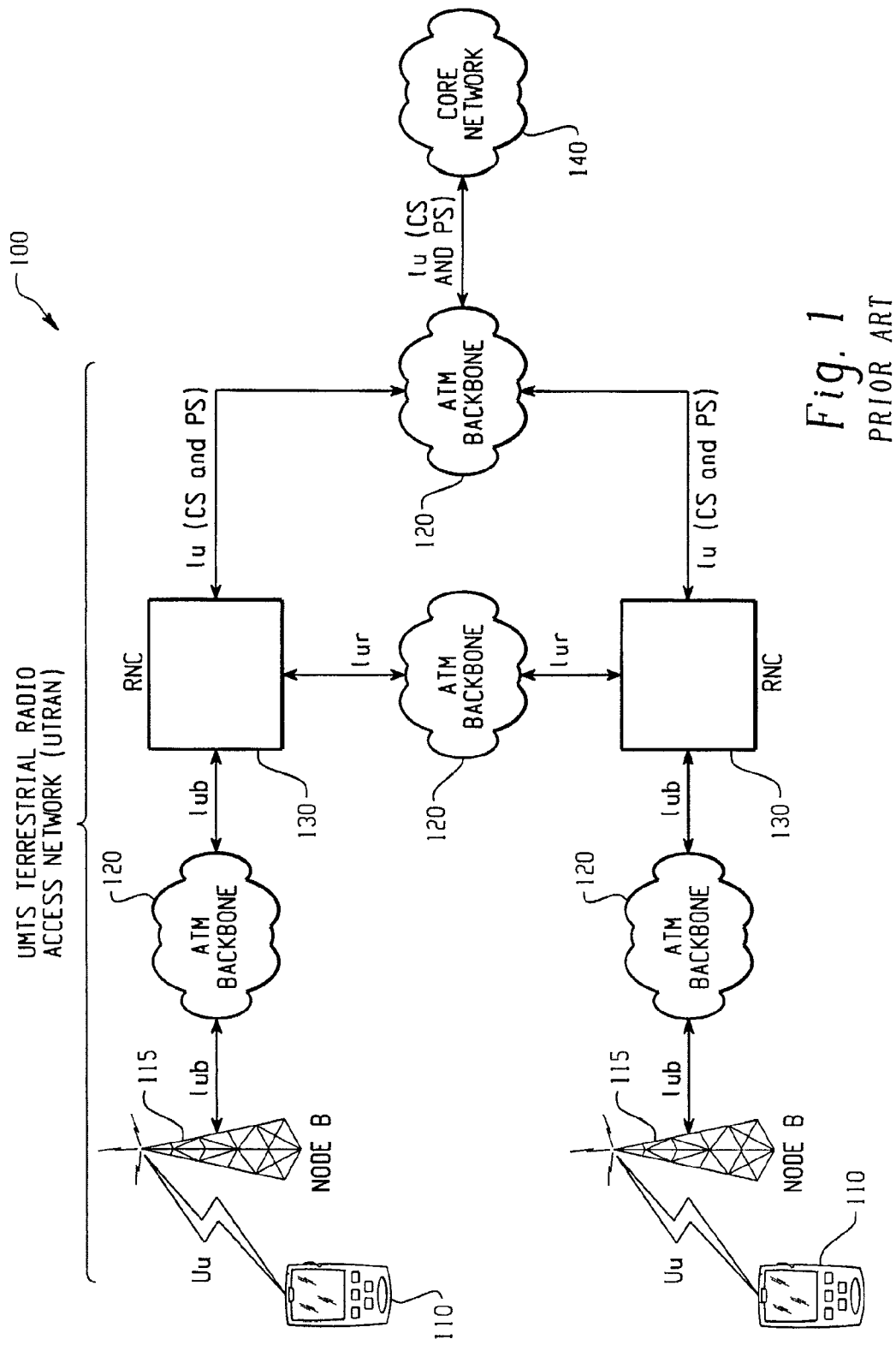
FIG. 1 is a block diagram illustrating a typical third generation (3G) wireless network.

With reference now to the drawing figures, FIG. 1 is a block diagram illustrating a typical third generation (3G) wireless network. The wireless network includes a Universal Mobile Telecommunications System (UMTS) Terrestrial Radio Access Network (UTRAN) 100 coupled via an ATM backbone 120 to a core network 140. Also illustrated are a plurality of user equipment devices 110 that may communicate wirelessly using the wireless network.

The UTRAN 100 includes multiple base stations 115 (referred to as Node B's), of which only two are illustrated, to communicate wirelessly using radio waves over the Uu interface with the user equipment devices 110. Depending on the capabilities of a particular UTRAN 100, an RNC 130 may support multiple Node B's 115 of the same mode or multiple Node B's operating in diverse modes. The ATM (Asynchronous Transfer Mode) backbone 120 couples the various UTRAN components together, and couples the UTRAN 100 to the core network 140.

Figure 2:
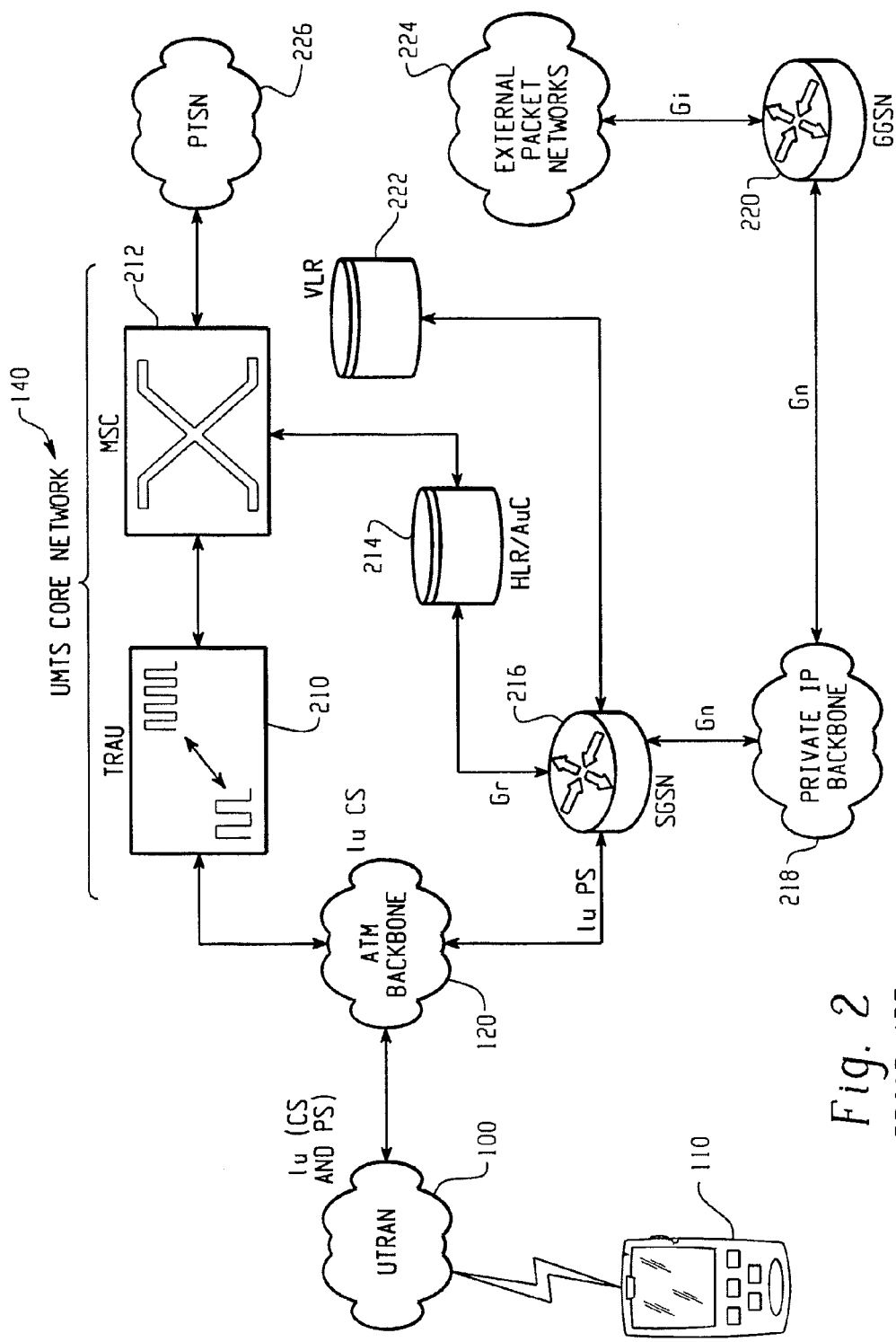
FIG. 2 is a block diagram of a typical core network.

FIG. 2 is a block diagram of a typical core network 140. Also illustrated is a user equipment device 110, which co-operates with the UTRAN 100 to communicate with the core network 140 via an ATM backbone 120. In operation, circuit switched (CS) packets may be sent and received via a transcoder/rate adapter unit (TRAU) 210, which converts UMTS speech packets to standard packets for a mobile switching center (MSC) 212 in order to communicate speech over a public switched telephone network (PSTN) 226. In addition, packet switched (PS) packets may be sent and received via a serving GPRS (General Packet Radio Service) support node (SGSN) 216, private IP backbone 218, Gateway GPRS Support Node (GGSN) 220, and external packet network 224.

Also included in the core network 140 are a visitor location register (VLR) 222 and a home location register/authentication center (HLR/AuC) 214. The VLR 222 stores the user equipment 110 information required for call handling and other functions within an associated service area. The HLR/AuC 214 stores permanent records used to identify the user equipment 110, and may also store temporary records, such as SGSN and VLR addresses.

In a typical 3G wireless network, three sets of protocols are used for transmitting data between the UTRAN and a user equipment device—the control plane protocols, the user plane protocols and the transport network user plane protocols. The user plane protocols implement radio bearer service by carrying user data through the access stratum. The control plane protocols are used to control the radio access bearers and the connection between UTRAN and user equipment.

Figure 3:
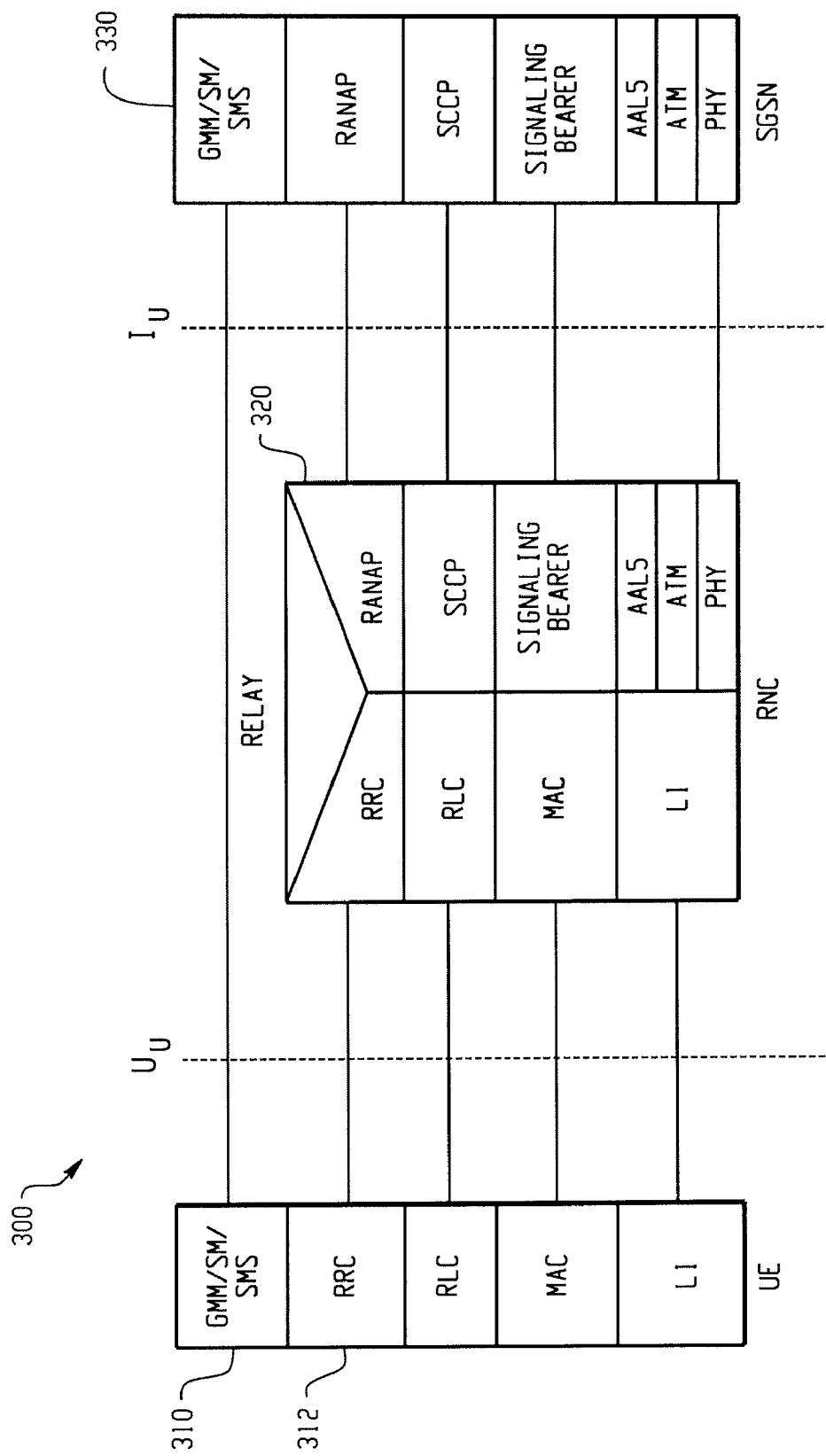
FIG. 3 is a diagram illustrating a typical UMTS control plane architecture between a user equipment device and an SGSN.

FIG. 3 is a diagram illustrating a typical UMTS control plane architecture 300 between a user equipment device and an SGSN. The control plane architecture 300 includes a user equipment control plane protocol stack 310, an RNC control plane protocol stack 320 and an SGSN control plane protocol stack 330. In particular, the RRC layer 312 is responsible for the overall control of radio resources for the user equipment device. Among other radio resource control functions, the RRC layer 312 is responsible for the establishment, reconfiguration and release of radio bearers (i.e., services provided for transferring data between the user equipment and the UTRAN). Radio bearers available for transmitting RRC messages are referred to as "signaling radio bearers" and are configured by the UTRAN in a Signaling Radio Bearer (RB) Information To Setup List information element (IE) that is transmitted from the UTRAN to the RRC in the user equipment device.

A more detailed description of a typical 3G wireless network, as illustrated in FIGS. 1-3, is provided in the International Mobile Telecommunications-2000 (IMT-2000) standard published by the International Telecommunications Union (ITU) and in the 3GPP standards documents published by the Third Generation Partnership Project (3GPP™), including standards documents 3GPP TS 23.101, 3GPP TS 25.301, 3GPP TS 25.331, and 3GPP TS 25.401, which are incorporated herein by reference.

Figure 4:
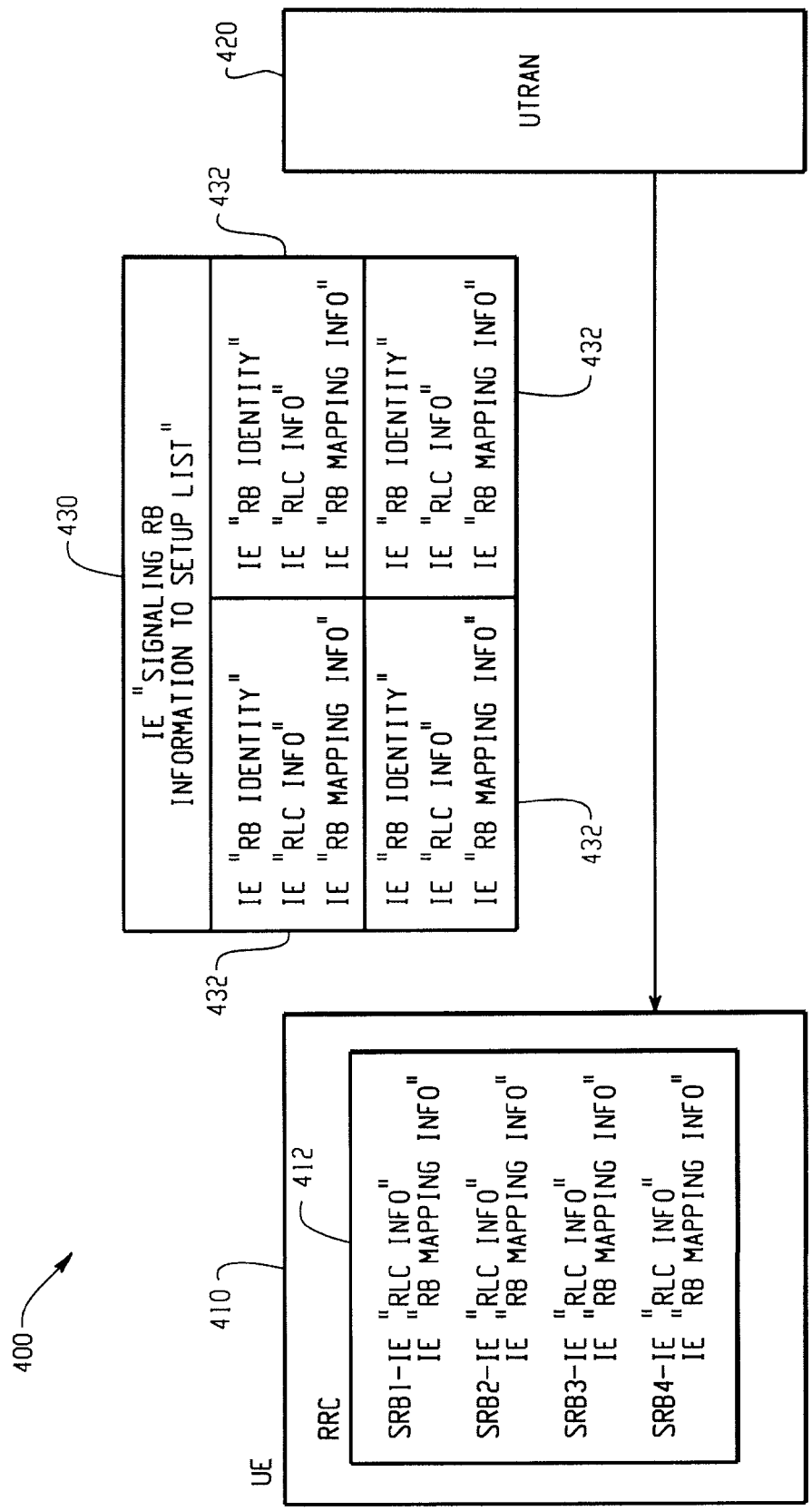
FIG. 4 is a block diagram illustrating an example Signaling RB Information To Setup List information element for configuring signaling radio bearers in the RRC layer of a user equipment device.

FIG. 4 is a block diagram 400 illustrating an example Signaling RB Information To Setup List IE 430 for configuring signaling radio bearers in the RRC layer 412 of a user equipment device 410. The Signaling RB Information To Setup List 430 is transmitted from the UTRAN 420 and includes a set of information elements 432 for each signaling radio bearer (SRB) to be configured. The Signaling RB Information To Setup List IE 430 may, for example, be a list where each element has the following ASN.1 structure.

```
SRB-InformationSetup ::= SEQUENCE{
    rb-Identity         RB-Identity OPTIONAL,
    rlc-InfoChoice      RLC-InfoChoice,
    rb-MappingInfo      RB-Mapping Info}
```

In accordance with standards document 3GPP TS 25.331, three signaling radio bearers (SRB1-SRB3) need to be configured for use with messages sent on a Dedicated Control Channel (DCCH), and one signaling radio bearer (SRB4) is optional. Under the standards documents, SRB1 is to be used for all messages sent on the DCCH when using RLC unacknowledged mode (RLC-UM). SRB 2 is to used for all messages sent on the DCCH when using RLC acknowledged mode, except for RRC messages carrying higher layer (NAS) signaling. SRB 3 and optionally SRB4 is to be used for RRC messages carrying higher layer (NAS) signaling and sent on the DCCH in RLC acknowledged mode.

The sets of information elements 432 transmitted in the Signaling RB Information To Setup List 430 from the UTRAN 420 are used by the RRC 412 to configure the signaling radio bearers. Information elements within the sets 432 may include an RB Identity information element, an RLC Info information element and an RB Mapping Info information element. The RB Identity information element is used to identify which signaling radio bearer (SRB1-SRB4) is to be configured by each set of information elements 432. The RB Mapping Info and RLC Info information elements are used to configure the signaling radio bearer identified by the RB Identity information element. More specifically, the RB Mapping Info information element is used to configure the multiplexing options for the identified signaling radio bearer, and the RLC Info information element is used to configure the transmitting and receiving RLC entities for the identified signaling radio bearer.

If the Signaling RB Information To Setup List IE 430 is included in an RRC Connection Setup Message from the UTRAN 420, then the standards require that the IE 430 configures each of SRB1-SRB3 and optionally SRB4. That is each of SRB1-SRB3 and optionally SRB4 should be identified and configured by the Signaling RB Information To Setup List IE 430. However, FIGS. 5 and 6 illustrate two examples of non-compliant Signaling RB Information To Setup List IEs 510, 610 that do not include the proper configuration information.

Figure 5:
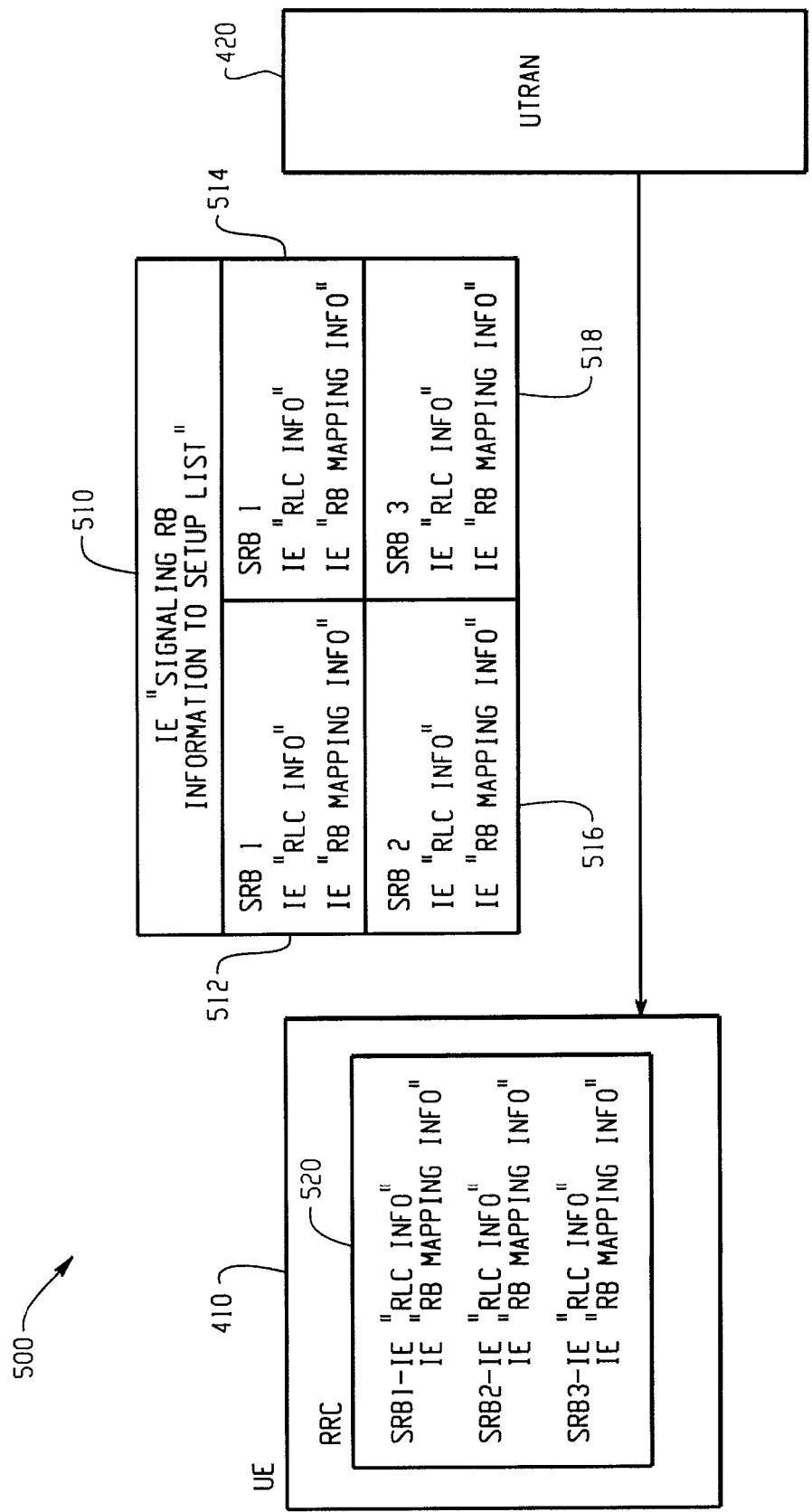
FIG. 5 illustrates an example of a non-compliant Signaling RB Information To Setup List IE that improperly specifies the same signaling radio bearer (SRB1) twice.

FIG. 5 illustrates an example of a non-compliant Signaling RB Information To Setup List IE 510 that improperly specifies the same signaling radio bearer (SRB1) twice. In this example 500, the non-compliant Signaling RB Information To Setup IE 510 includes four sets of information elements 512, 514, 516, 518. Two of the sets 512, 514 include RB Identity information elements that specify the same signaling radio bearer—SRB1. The other two information element sets 516, 518 specify SRB2 and SRB 3, respectively.

Figure 6:
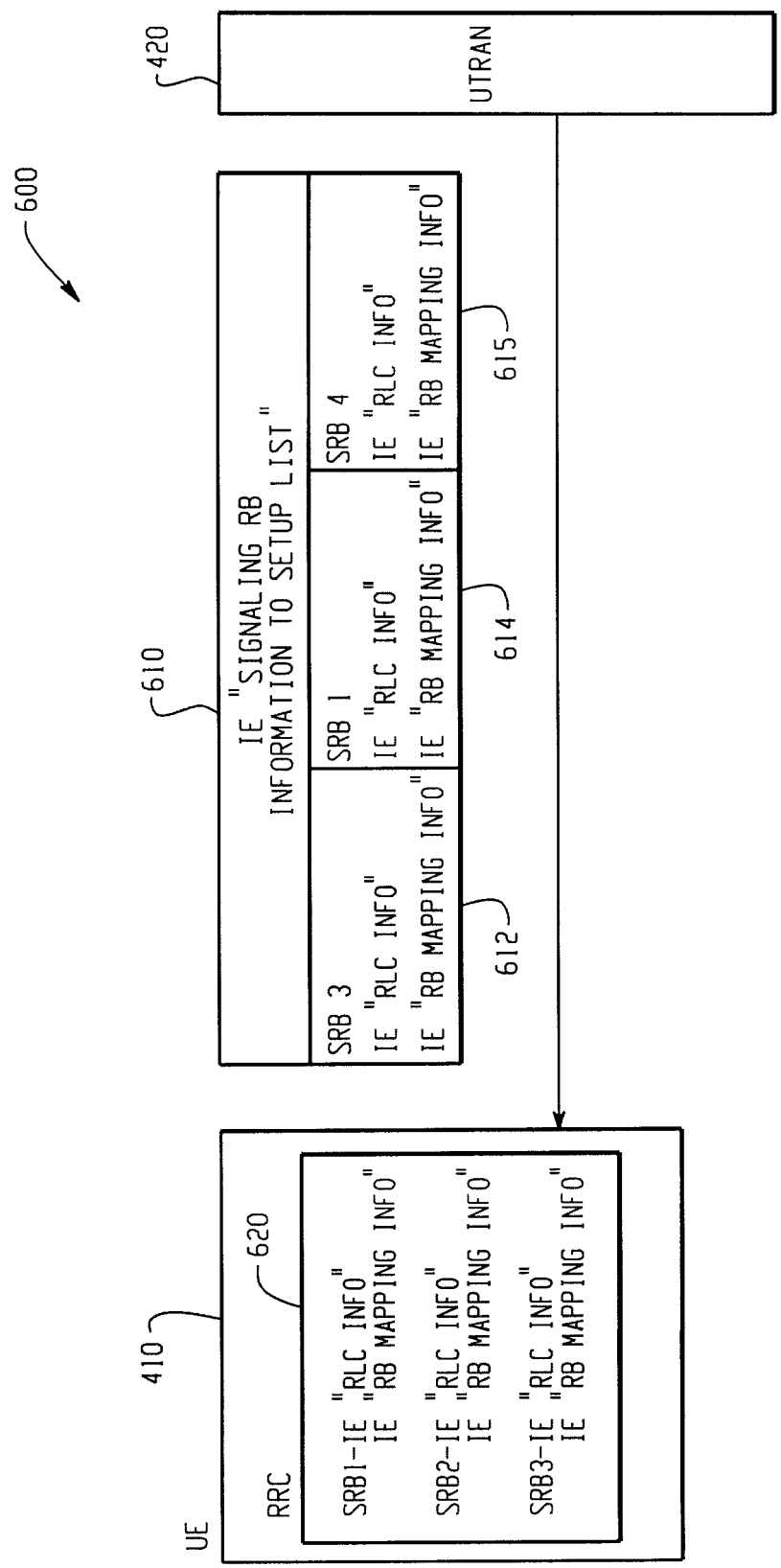
FIG. 6 illustrates another example of a non-compliant Signaling RB Information To Setup List IE that does not include configuration information for a necessary signaling radio bearer.

FIG. 6 illustrates another example of a non-compliant Signaling RB Information To Setup List IE 600 that does not include configuration information for a necessary signaling radio bearer. As noted above, the standards documents require that signaling radio bearers SRB1-SRB3 be configured if the SRB list 610 is sent in an RRC Connection Setup Message. However, the illustrated Signaling RB Information To Setup List IE 600 only includes configuration information 612, 614, and 615 for SRB1, SRB3 and SRB4. It should be noted that if the Signaling RB Information To Setup List 610 is included in a message other than an RRC Connection Setup Message, then the standards do not require that any SRBs be configured.

Figures 7, 8:
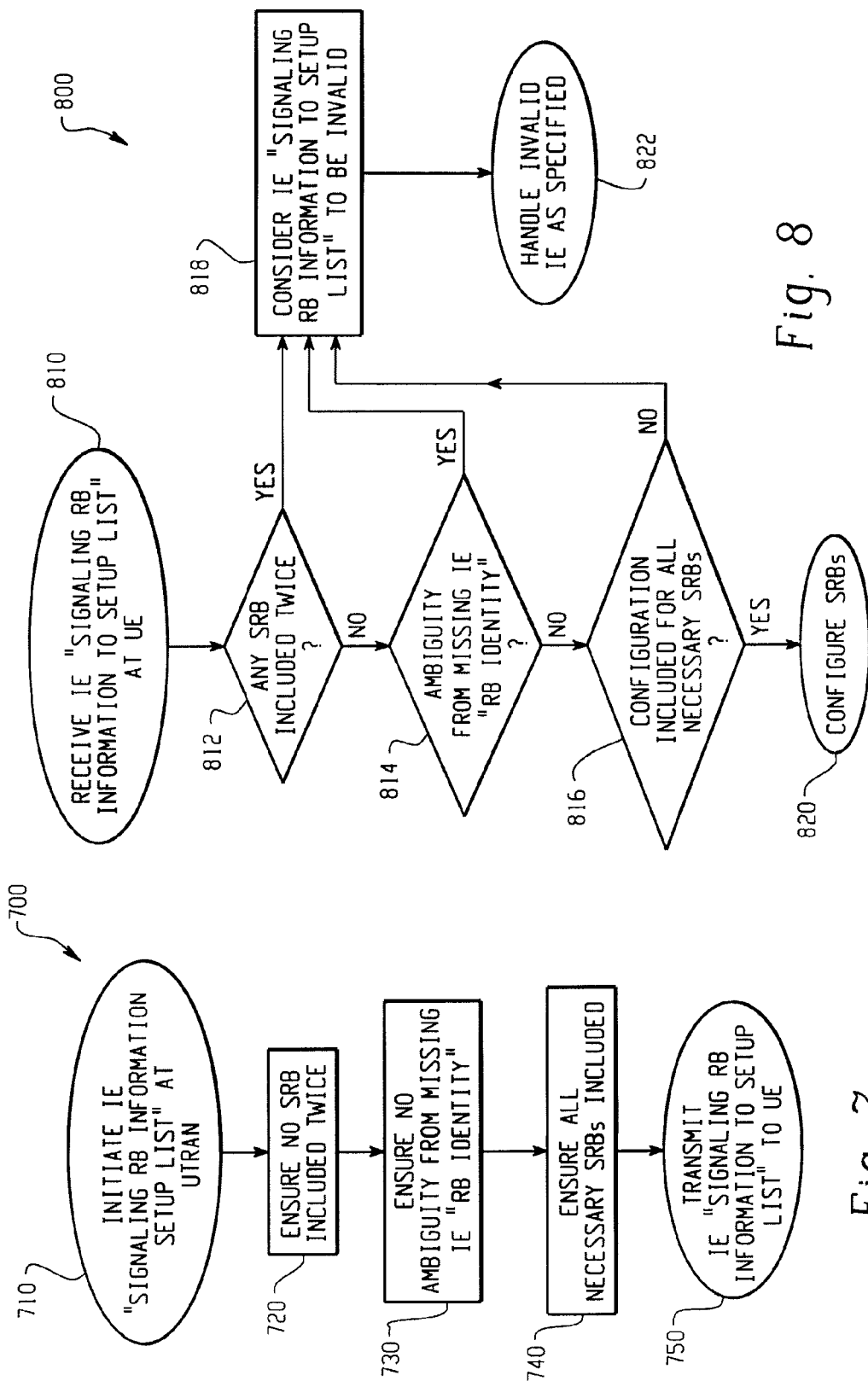
FIGS. 7-9 illustrate three example methods for configuring signaling radio bearer information in a user equipment protocol stack.
Figure 9:
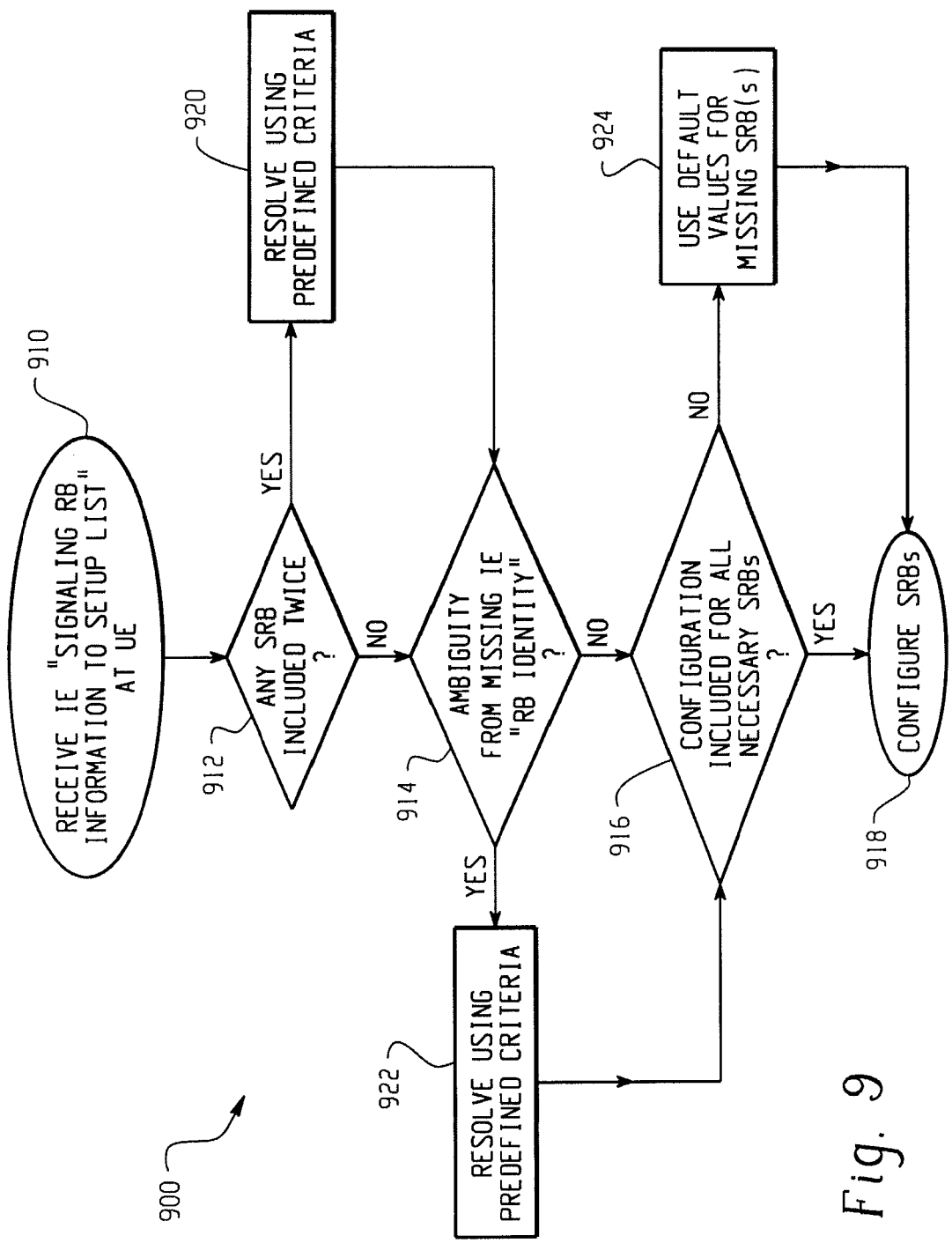

FIGS. 7-9 illustrate three example methods 700, 800, 900 for configuring signaling radio bearer information in a user equipment protocol stack. These example methods help to ensure that the signaling radio bearers (SRB1-SRB4) are properly configured in accordance with the standards documents. FIG. 7 is a method 700 that may be performed at the UTRAN 420 and FIGS. 8 and 9 are methods 800, 900 that may be performed by a user equipment device 410.

With reference first to FIG. 7, the method begins at step 710 when the UTRAN receives an instruction to initiate a Signaling RB Information Setup List to configure a user equipment device 410. At step 720, the UTRAN 420 processes the configuration information to ensure that the sets of information elements to be included in the Signaling RB Information Setup List do not specify the same signaling radio bearer twice, as shown in FIG. 5.

At step 730, the UTRAN 420 ensures that there are no radio bearer identity IEs missing from the Signaling RB Information Setup List that would result in an ambiguity under the 3G standard documents. Standard document 3GPP TS 25.331, version 3.10.0, includes two sections, 8.6.4.1 and 11.3, that both address the situation in which radio bearer identity IEs are missing from the Signaling RB Information Setup List. Section 8.6.4.1 requires that in the event of a missing radio bearer identity IE (i.e., an unnumbered SRB), the UE "apply a default value of the IE 'RB identity' equal to 1 for the first IE 'Signaling RB information to setup,' and increase the default value by 1 for each occurrence." However, section 11.3 of the standard document requires that if the IE "RB identity" is missing from a Signaling RB Information Setup List, then the smallest unused value is to be used. In some cases, the application of sections 8.6.4.1 and 11.3 may achieve different results. Step 730 prevents the UTRAN from creating a Signaling RB Information Setup List that would result in an ambiguity between sections 8.6.4.1 and 11.3 of the standard document 3GPP TS 25.331, version 3.10.0. This may be achieved by either ensuring that radio bearer identity IEs (i.e., IE "RB identity") are included for each signaling radio bearer configuration in the Signaling RB Information Setup List or by ensuring that no radio bearer identity IEs are included in the Signaling RB Information Setup List.

At step 740, the UTRAN 420 ensures that configurations are included in the Signaling RB Information To Setup List for necessary signaling radio bearers (i.e., SRBs required by the applicable 3G standard). The UTRAN 420 may, for example, ensure that each of SRB1-SRB3 have either already been configured on the user equipment device 410 or that necessary configurations are included in the Signaling RB Information To Setup List IE. The Signaling RB Information To Setup List IE is then transmitted from the UTRAN 420 to the user equipment device 410 at step 750.

With reference to FIG. 8, the method 800 begins at step 810 when the user equipment device 410 receives a Signaling RB Information To Setup List IE from the UTRAN 420. At step 812, the user equipment device 410 determines if the received Signaling RB Information To Setup List IE specifies the same signaling radio bearer (SRB) twice, as shown in FIG. 5. If so, then the method identifies the received IE as an invalid or anomalous Signaling RB Information To Setup List at step 818. Otherwise, if no two SRBs are identified more than once in the Signaling RB Information To Setup List, then the method proceeds to step 814.

At step 814, the method 800 determines if any signaling radio bearer identity IEs are missing from the Signaling RB Information Setup List that would result in an ambiguity under sections 8.6.4.1 and 11.3 of standard document 3GPP TS 25.331, version 3.10.0, as described above with reference to FIG. 7. If so, then the method 800 identifies the received IE as an invalid or anomalous Signaling RB Information To Setup List at step 818. Otherwise, if no signaling radio bearer identity IEs are omitted that would result in an ambiguity under the 3G standard documents, then the method proceeds to step 816.

At step 816, the method 800 determines if the Signaling RB Information To Setup List includes configuration information for all of the necessary signaling radio bearers (i.e., SRBs required by the applicable 3G standard) that have not already been configured on the user equipment device 410. If all of the necessary SRB configuration information is not included, then the method 800 identifies the received IE as an invalid or anomalous Signaling RB Information To Setup List at step 818. Otherwise, if all of the necessary SRB configuration information is included in the received Signaling RB Information To Setup List, then the configuration information is used to configure the signaling radio bearers at step 820.

If the received Signaling RB Information To Setup List IE is identified as invalid or anomalous at step 818, then the method 800 processes the IE in accordance with a pre-determined procedure at step 822. For example, in accordance with the 3G standards, the user equipment device may report an invalid or anomalous IE to the UTRAN and receive a new RRC Connection Setup Message or may return to an idle state without notifying the UTRAN of the invalid or anomalous IE.

With reference now to FIG. 9, another example method 900 begins at step 910 when a Signaling RB Information To Setup List is received by a user equipment device 410. At step 912, the user equipment device 410 determines if the received Signaling RB Information To Setup List IE specifies the same signaling radio bearer (SRB) twice, as shown in FIG. 5. If no two SRBs are identified more than once in the Signaling RB Information To Setup List, then the method proceeds to step 914. Otherwise, if multiple occurrences of an SRB are identified in step 912, then the method resolves the anomalous IE using a pre-defined criteria at step 920. For example, if an SRB is included twice, then at step 920 the user equipment device 410 may define one of the occurrences (e.g., the first or last occurrence) as the configuration to be used, with all other occurrences being ignored. Upon resolving the multiple SRBs, the method proceeds to step 914.

At step 914, the method 900 determines if any signaling radio bearer identity IEs are missing from the Signaling RB Information Setup List that would result in an ambiguity under sections 8.6.4.1 and 11.3 of standard document 3GPP TS 25.331, version 3.10.0, as described above with reference to FIG. 7. If not, then the method proceeds to step 916. If one or more signaling radio bearer identity IEs are omitted that would result in an ambiguity under the 3G standard documents, however, then the method 900 resolves the anomalous IE using a pre-determined criteria at step 922. For example, the pre-determined criteria 922 may instruct the UE to resolve the one or more missing SRB identity IEs using the defaults set forth in one of section 8.6.4.1 or section 11.3 of standard document 3GPP TS 25.331, version 3.10.0.

At step 916, the method 900 determines if the Signaling RB Information To Setup List includes configuration information for all of the necessary signaling radio bearers (i.e., SRBs required by the applicable 3G standard) that have not already been configured on the user equipment device 410. If all of the necessary SRB configuration information is included, then the method 900 proceeds to configure the signaling radio bearers at step 918. Otherwise, if configuration information for one or more necessary SRBs is not included, then the method resolves the anomalous IE by selecting default configuration values for the one or more SRBs at step 924. Upon resolving the missing configuration error at step 924, the method 900 proceeds to step 918 to configure the signaling radio bearers.

Figure 10:
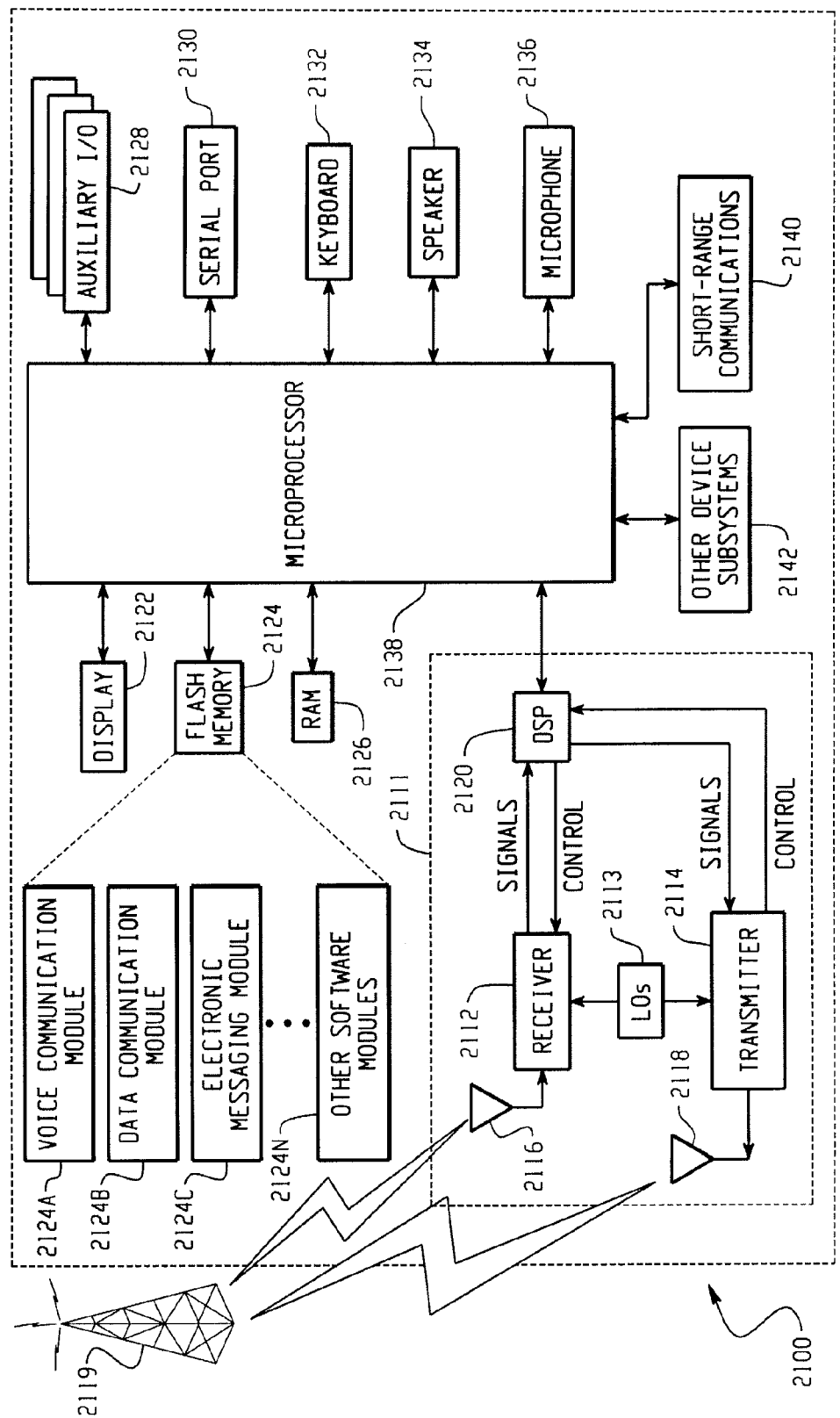
FIG. 10 is a block diagram illustrating an example mobile communication device that may be used as the user equipment device described herein.

FIG. 10 is a block diagram illustrating an example mobile communication device 2100 that may be used as the user equipment device described above. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2132 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

What is claimed:

1. A network component comprising:
    a processor configured to receive an instruction to generate a signaling radio bearer configuration information element (IE) that includes configuration information for a pre-selected number of signaling radio bearers, generate the signaling radio bearer configuration IE, determine whether duplicate configuration information is included in the signaling radio bearer configuration IE, determine which signaling radio bearers have been previously configured on a user equipment (UE), and ensuring the signaling radio bearer configuration IE includes configuration information for all remaining necessary signaling radio bearers for the UE, but not the radio bearers that have been previously configured on the UE.

2. The network component of claim 1, wherein the processor is further configured to, when the signaling radio bearer configuration IE includes configuration information for all necessary signaling radio bearers, configure all the signaling radio bearers.

3. The network component of claim 1, wherein the processor is further configured to, when the signaling radio bearer configuration IE does not include configuration information for all necessary signaling radio bearers, select default configuration values for one or more signaling radio bearers, and configure the one or more signaling radio bearers.

4. A method performed by a network component, the method comprising:
    receiving an instruction to generate a signaling radio bearer configuration information element (IE) that includes configuration information for a pre-selected number of signaling radio bearers;
    generating the signaling radio bearer configuration IE;
    determining whether duplicate configuration information is included in the signaling radio bearer configuration IE;
    determining which signaling radio bearers have been previously configured on a user equipment (UE); and ensuring the signaling radio bearer configuration IE includes configuration information for all remaining necessary signaling radio bearers for the UE, but not the radio bearers that have been previously configured on the UE.

5. The method of claim 4, further comprising:
when the signaling radio bearer configuration IE includes configuration information for all necessary signaling radio bearers, configuring all the signaling radio bearers.

6. The method of claim 4, further comprising:
when the signaling radio bearer configuration IE does not include configuration information for all necessary signaling radio bearers, selecting default configuration values for one or more signaling radio bearers; and
configuring the one or more signaling radio bearers.

* * * * *